US007893344B2

(12) United States Patent
Hirano

(10) Patent No.: US 7,893,344 B2
(45) Date of Patent: Feb. 22, 2011

(54) TOUCH DETECTING DEVICE OF KEYBOARD INSTRUMENT

(75) Inventor: Tetsuya Hirano, Hamamatsu (JP)

(73) Assignee: Kabushiki Kaisha Kawai Gakki Seisakusho, Shizuoka-ken (JP)

( * ) Notice: Subject to any disclaimer, the term of this patent is extended or adjusted under 35 U.S.C. 154(b) by 328 days.

(21) Appl. No.: 12/067,031

(22) PCT Filed: Apr. 7, 2006

(86) PCT No.: PCT/JP2006/307459

§ 371 (c)(1),
(2), (4) Date: Mar. 14, 2008

(87) PCT Pub. No.: WO2007/032115

PCT Pub. Date: Mar. 22, 2007

(65) Prior Publication Data

US 2009/0178547 A1 Jul. 16, 2009

(30) Foreign Application Priority Data

Sep. 15, 2005 (JP) ............................ 2005-269223

(51) Int. Cl.
*G01H 1/34* (2006.01)
*G01H 3/00* (2006.01)

(52) U.S. Cl. ............................ 84/745; 84/718; 84/719; 84/720; 84/743; 84/744

(58) Field of Classification Search ....................... None
See application file for complete search history.

(56) References Cited

U.S. PATENT DOCUMENTS

| | | | | |
|---|---|---|---|---|
| 5,641,925 | A * | 6/1997 | Koseki | 84/462 |
| 5,824,930 | A * | 10/1998 | Ura et al. | 84/462 |
| 6,245,985 | B1 * | 6/2001 | Sasaki et al. | 84/658 |
| 6,297,437 | B1 * | 10/2001 | Ura et al. | 84/423 R |
| 7,491,880 | B2 * | 2/2009 | Hirota et al. | 84/724 |
| 2002/0059862 | A1 * | 5/2002 | Muramatsu et al. | 84/719 |
| 2003/0202753 | A1 * | 10/2003 | Kato et al. | 385/88 |
| 2005/0077453 | A1 * | 4/2005 | Kato | 250/221 |
| 2006/0185497 | A1 * | 8/2006 | Hirota et al. | 84/423 R |
| 2008/0017019 | A1 * | 1/2008 | Hirota et al. | 84/744 |

FOREIGN PATENT DOCUMENTS

| | | |
|---|---|---|
| JP | 2-160292 | 6/1990 |
| JP | 03-160496 | 7/1991 |
| JP | 07-160263 | 6/1995 |

* cited by examiner

*Primary Examiner*—Marlon T Fletcher
(74) *Attorney, Agent, or Firm*—Crowell & Moring LLP

(57) ABSTRACT

There is provided a touch detecting device of a keyboard instrument, which makes it possible not only to enhance the mounting density of a plurality of optical sensors, but also to detect touch information of a key with high accuracy without being affected by light from the other optical sensors. The touch detecting device comprises a shutter 6 that moves in accordance with pivotal motion of a key 4, a plurality of optical sensors 7 and 8 that are provided close to a pivotal path of the shutter 6 and have respective light emitting parts 7*a* and 8*a* and respective light receiving parts 7*b* and 8*b* for receiving light emitted from the light emitting parts, on respective opposite sides of the pivotal path, and touch information detecting means 23 for detecting, as the key 4 pivotally moves, the touch information based on presence or absence of light received by the light receiving parts of the optical sensors 7 and 8 in accordance with opening or closing of optical paths of light from the light emitting parts of the optical sensors 7 and 8, by the shutter 6. Adjacent two of the optical sensors 7 and 8 are arranged such that the light emitting part of one of the two and the light receiving part of the other of the two disposed adjacent to each other on the same side of the pivotal path of the shutter 6.

2 Claims, 14 Drawing Sheets

(a)

(b)

(a)

(b)

TOUCH DETECTING DEVICE OF KEYBOARD INSTRUMENT

FIELD OF THE INVENTION

The present invention relates to a touch detecting device of a keyboard instrument, which is applied to an electronic keyboard instrument, such as an electronic piano, and a hybrid piano, such as a silent piano or an automatic performance piano, and is configured to detect touch information containing key depression information.

BACKGROUND ART

As a conventional touch detecting device of a keyboard instrument, there has been known one disclosed e.g. in Patent Literature 1. This keyboard instrument is an upright automatic performance piano, and is comprised of pivotally movable keys (not shown) and hammers 63 each of which pivotally moves in accordance with depression of an associated key to strike an associated string 62, as shown in FIG. 14. As shown in FIG. 14, the touch detecting device 61 includes a shutter 64 attached to an associated one of the hammers 63, and first to third sensors 65 to 67. The shutter 64 is in the form of a plate shape, and extends upward along a catcher shank 63*a* of the hammer 63 in a state secured to the same. The shutter 64 has an upper edge part thereof formed with first to third steps 64*a*, 64*b*, and 64*c* in a manner forming stairs. The first step 64*a* is highest, and the third step 64*c* is lowest.

The first to third sensors 65 to 67 are arranged adjacent to each other in a manner corresponding to the respective first to third steps 64*a* to 64*c*, and each of the sensors 65 to 67 is comprised of a pair of a light emitting part and a light receiving part (neither of which is shown). The light emitting parts are disposed on one side of a traveling path of the shutter 64, and the light receiving parts are disposed on the other side of the traveling path in facing relation to the respective associated light emitting parts so as to receive light emitted therefrom. In a key released state (a position indicated by solid lines in FIG. 14), the shutter 64 is positioned below the first to third sensors 65 to 67 without overlapping them.

With this arrangement, as the hammer 63 pivotally moves about a center pin 68 in a counterclockwise direction, as viewed in FIG. 14, in accordance with key depression, the shutter 64 pivotally moves along with the hammer 63. In accordance with this pivotal motion, the first step 64*a* of the shutter 64 reaches the first sensor 65, whereby light from the light emitting part is blocked to prevent light reception by the associated light receiving part. When the hammer 63 further moves pivotally, light from the light emitting part of the second sensor 66 is blocked to prevent light reception by the associated light receiving part, and when the hammer 63 further moves pivotally, light from the light emitting part of the third sensor 67 is blocked to prevent light reception by the associated light receiving part. On the other hand, when the key is released, the states of blocking light from the light emitting parts are released in the reverse order to the above, whereby the light receiving parts of the respective sensors return to the light receiving states.

The first to third sensors 65 to 67 each output a "Low" signal as a detection signal when the amount of light received by a light receiving part thereof is not lower than a predetermined level, while they each output a "High" signal as a detection signal when the amount of light is lower than the predetermined level. The detection signal from the first sensor 65 is used for detection of key depression or key release. Specifically, timing in which the detection signal changes from "Low" to "High" (hereinafter referred to as "the light shielding timing") is detected as key depression timing, and timing in which the detection signal changes from "High" to "Low" (hereinafter referred to as "the light receiving timing") is detected as key release timing. On the other hand, the detection signals from the second and third sensors 66 and 67 are used for detection of a key depression speed. Specifically, the depression speed of a key is determined based on a time lag between the light shielding timing of the second sensor 66 and that of the third sensor 67.

However, in this conventional touch detecting device 61, the light emitting parts of the respective first to third sensors 65 to 67 are arranged adjacent to each other on one side of the traveling path of the shutter 64, and the associated light receiving parts are arranged adjacent to each other on the other side of the traveling path. Therefore, when light beams emitted from the respective light emitting parts are divergent, each of the light beams diffuses as approaching the associated light receiving part, and hence the light emitting part of the first sensor 65, for example, receives not only light from the light emitting part of the first sensor 65, but also light from the light emitting part of the adjacent second sensor 66.

FIG. 15 schematically shows the above-mentioned situation. More specifically, as shown in FIG. 15(*a*), since a light beam from a light emitting part SO1*a* of a first sensor SO1 is divergent, the light beam reaches not only a light receiving part SO1*b* of the first sensor SO1, but also a light receiving part SO2*b* of a second sensor SO2. For this reason, as shown in FIG. 15(*b*), even in a state where the light beam from the light emitting part SO1*a* of the first sensor SO1 is blocked by a shutter S, the light receiving part SO1*b* of the first sensor SO1 receives a light beam from a light emitting part SO2*a* of the second sensor SO2. As a consequence, in the conventional touch detecting device 61, the light shielding timing of the first sensor 65 delays during key depression, whereas during key release, the light receiving timing advances. This makes it impossible to detect key depression timing or key release timing with accuracy. Further, in detecting the key depression speed, the light shielding timing of the second sensor 66 delays, whereas that of the third sensor 67 does not delay because the third sensor 67 is not affected by light from the light emitting part of the second sensor 66. As a result, the time lag between the two light shielding timings becomes smaller than the difference between actual passage times of the shutter 64, and therefore the detected key depression speed becomes larger than the actual key depression speed. Thus, the key depression speed cannot be accurately detected.

Further, a degree of deviation in each of the light shielding timing and the light receiving timing varies according to the position of passage of the shutter 64 between the light emitting parts of the first to third sensors 65 to 67 and the light receiving parts of the first to third sensors 65 to 67. FIG. 16 schematically shows this situation. More specifically, when the position of passage of the shutter 64 is close to the light receiving parts SO1*b* and SO2*b* as shown in FIG. 16(*a*), light from the second sensor SO2 is more readily blocked, making it difficult for the light to reach the light receiving part SO1*b* of the first sensor SO1, which reduces the degree of deviation in each of the light shielding timing and the light receiving timing. On the other hand, when the position of passage of the shutter 64 is close to the light emitting parts SO1*a* and SO2*a* as shown in FIG. 16(*b*), the light from the second sensor SO2 cannot be readily blocked, making it easier for the light to reach the light receiving part SO1*b* of the first sensor SO1, which increases the degree of deviation in each of the light shielding timing and the light receiving timing. As described above, the degree of deviation in each of the light shielding timing and the light receiving timing varies according to the position of passage of the shutter 64, and therefore the key depression and release timings and the key depression speed, which are detected based on the light shielding timing and the light receiving timing, also vary according to the position of passage of the shutter 64.

The above-mentioned problems can be solved by increasing the distances between the first to third sensors 65 to 67 to such an extent as will prevent each light receiving part thereof from being affected by light from the light emitting part of the other sensors. In this case, however, not only degradation of the mounting density of the sensors, but also an increase in the distance between the second and third sensors 66 and 67, i.e. an increase in the length of a key depression speed-detecting section is caused, which makes it impossible to accurately detect e.g. a key depression speed immediately before the hammer 63 strikes the string 62, which is important as key depression information. Alternatively, it can also be envisaged to solve the above-mentioned problems e.g. by reducing the intensity of light emission from the light emitting parts of the first to third sensors 65 to 67 to such a level as will prevent each light receiving part thereof from being affected by light from the light emitting part of the other sensors. In this case, however, the total amount of light received by the light receiving part is reduced, and hence, even though a light receiving part is in the light receiving state, the amount of light received by the light receiving part sometimes becomes lower than a predetermined level, which causes instability of the detection signal and thereby considerably degrades the accuracy of detection of the key depression and release timings and that of detection of the key depression speed.

The present invention has been made in order to solve the above problems, and an object thereof is to provide a touch detecting device of a keyboard instrument, which makes it possible not only to enhance the mounting density of a plurality of optical sensors, but also to detect touch information of a key with high accuracy without being affected by light from the other optical sensors.

[Patent Literature 1] Japanese Laid-Open Patent Publication (Kokai) No. H02-160292

DISCLOSURE OF THE INVENTION

To attain the above object, the invention as claimed in claim 1 is a touch detecting device of a keyboard instrument, for detecting touch information containing key depression information of a pivotally movable key, comprising a shutter that pivotally moves in accordance with pivotal motion of the key, a plurality of optical sensors that are provided close to a pivotal path of the shutter, and each have a light emitting part and a light receiving part for receiving light emitted from the light emitting part, the light emitting part and the light receiving part being disposed on respective opposite sides of the pivotal path, touch information detecting means for detecting, as the key pivotally moves, the touch information based on presence or absence of light received by the light receiving parts of the optical sensors, in accordance with opening or closing of optical paths of light from the light emitting parts of the optical sensors, by the shutter, wherein adjacent two of the optical sensors are arranged such that the light emitting part of one of the two and the light receiving part of the other of the two are disposed adjacent to each other on a same side of the pivotal path of the shutter.

According to this touch detecting device of a keyboard instrument, the key is pivotally moved by being depressed or released, and the shutter which performs pivotal motion in accordance with the pivotal motion of the key sequentially opens or closes the optical paths of light from the light emitting parts of the respective optical sensors adjacent to each other. The touch information detecting means detects touch information containing key depression information, based on absence or presence of light received by the light receiving parts in accordance with opening or closing of the optical paths.

According to the present invention, adjacent two of the optical sensors are arranged such that the light emitting part of one of the two and the light receiving part of the other of the two are disposed adjacent to each other on the same side of the pivotal path of the shutter. For this reason, even when light beams emitted from the light emitting parts are divergent, light from the light emitting part of one of the optical sensors reaches only the light receiving part of the optical sensor and the light emitting part of the other optical sensor, which is adjacent to the light receiving part, but never reaches the light receiving part of the other optical sensor. Therefore, when only one of the optical paths of the respective optical sensors is closed by the shutter, the associated light receiving part does not receive light from the light emitting part of the other optical sensor, so that it is possible to cause switching timing between presence and absence of light received by the light receiving part to coincide with timing in which the optical path is actually opened or closed by the shutter. Therefore, even when the light beams emitted from the light emitting parts are divergent, it is possible to detect touch information of a key with high accuracy without being adversely affected by light from the other optical sensors.

For the same reason, it is possible to cause timing of switching between presence and absence of light received by the light receiving part to coincide with timing in which the optical path is actually opened or closed by the shutter, irrespective of the position of passage of the shutter between the light emitting part and the light receiving part of the optical sensor. Further, even when the distance between the optical sensors is reduced, detection accuracy is not affected, so that by reducing the distance, it is possible to enhance the mounting density of the optical sensors, and due to reduced length of a section for detecting the key depression speed, detect a key depression speed immediately before striking of the string, which is important as key depression information, with high accuracy, for example. Furthermore, even when light emission intensity is set to a high level, detection accuracy is not affected, so that by setting the light emission intensity to a high level, it is possible to stabilize the outputs from the respective optical sensors to thereby detect touch information of the key with further enhanced accuracy.

The invention as claimed in claim 2 is a touch detecting device of a keyboard instrument, as claimed in claim 1, wherein the shutter is configured to reduce an amount of light reflected thereby.

In the touch detecting device according to claim 1, in a state where the optical path of one of the optical sensors is closed by the shutter, light from the light emitting part of the other optical sensor can be reflected by the shutter to reach the light receiving part of the one sensor. According to the present invention, since the shutter is configured as above, when light from the other optical sensor is reflected by the shutter, the amount of the reflected light is reduced by the shutter. Therefore, even when the reflected light has reached the light receiving part of the one sensor, it is possible to reliably eliminate adverse influence of the reflected light.

BEST MODE FOR CARRYING OUT THE INVENTION

Figure 1:
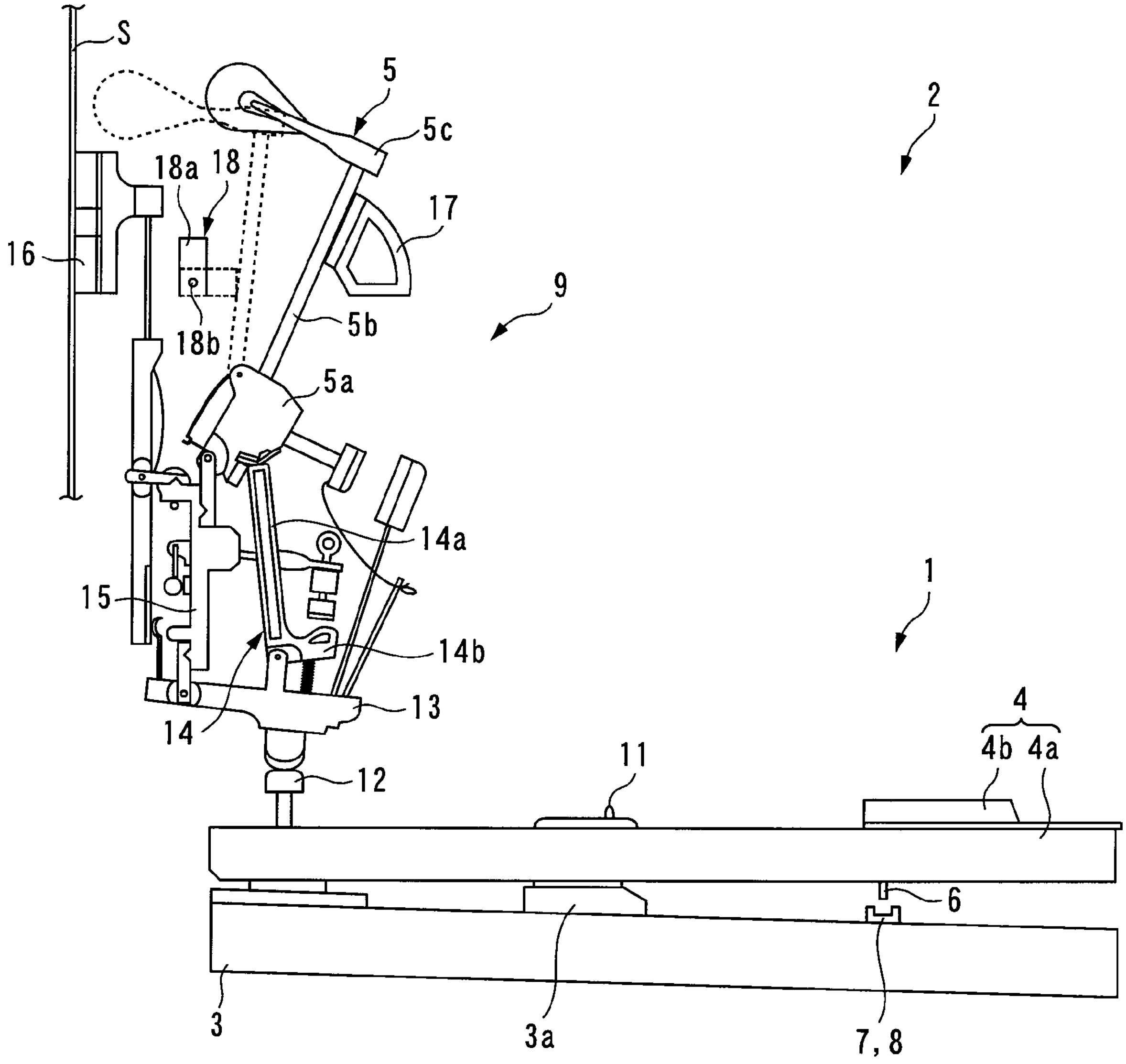
[FIG. 1] A schematic view of a touch detecting device according to a first embodiment of the present invention and a silent piano to which is applied the touch detecting device.

The invention will now be described in detail with reference to the drawings showing preferred embodiments thereof. FIG. 1 shows a upright silent piano 2 (keyboard instrument) to which is applied a touch detecting device 1 according to a first embodiment of the present invention. In the following description, a player's side of the silent piano (right side as viewed in FIG. 1) will be referred to as "front", and a remote side (left side as viewed in FIG. 1) from the player's side as "rear". Further, the player's left side will be referred to as "left", and the player's right side as "right".

As shown in FIG. 1, the silent piano 2 is comprised of a plurality of (e.g. eighty-eight) keys 4 (only one of which is shown) mounted on a keybed 3 and including white keys 4*a* and black keys 4*b*, an action 9 provided above the rear part of each key 4, a hammer 5 provided for the key 4 to strike an associated string S, and a musical tone generator 10 (see FIG. 7) for electronically generating performance sound. In the silent piano 2, the performance mode can be switched between a normal performance mode in which the hammer 5 strikes the associated string S to thereby generate acoustic performance sound, and a silent performance mode in which performance sound is generated by the musical tone generator 10 in a state where striking of the string by the hammer 5 is inhibited.

The key 4 is pivotally supported by a balance pin 11 erected on a balance rail 3*a* mounted on the keybed 3, via a balance pin hole (not shown) formed in the center of the key 4.

The action 9 is for causing the hammer 5 to perform pivotal motion in accordance with depression of the key 4, and extends in the front-rear direction. The action 9 includes a wippen 13 attached to the rear part of the key 4 via a capstan screw 12, and a jack 14 attached to the wippen 13. Each wippen 13 has a rear end thereof pivotally supported on a center rail 15. The jack 14 has an L-shape formed by a vertically extending hammer push-up part 14*a* and an engaging part 14*b* extending forward from a lower end of the hammer push-up part 14*a* substantially at right angles thereto. The jack 14 has its corner pivotally attached to the wippen 13. Further, a damper 16 is pivotally attached to the rear end of the center rail 15.

On the other hand, the hammer 5 is comprised of a butt 5*a*, a hammer shank 5*b* extending upward from the butt 5*a*, and a hammer head 5*c* attached to an upper end of the hammer shank 5*b*, and is pivotally attached to the center rail 15 by the lower end of the butt 5*a* thereof. In a key-released state shown in FIG. 1, the hammer 5 has the butt 5*a* thereof engaged with has one end of the hammer push-up part 14*a* of the jack 14, the hammer shank 5*b* thereof held diagonally in contact with a hammer rail 17, and the hammer head 5*c* thereof opposed to the string S.

The touch detecting device 1 includes a shutter 6 and first and second optical sensors 7 and 8 provided for each key 4.

Figure 2:
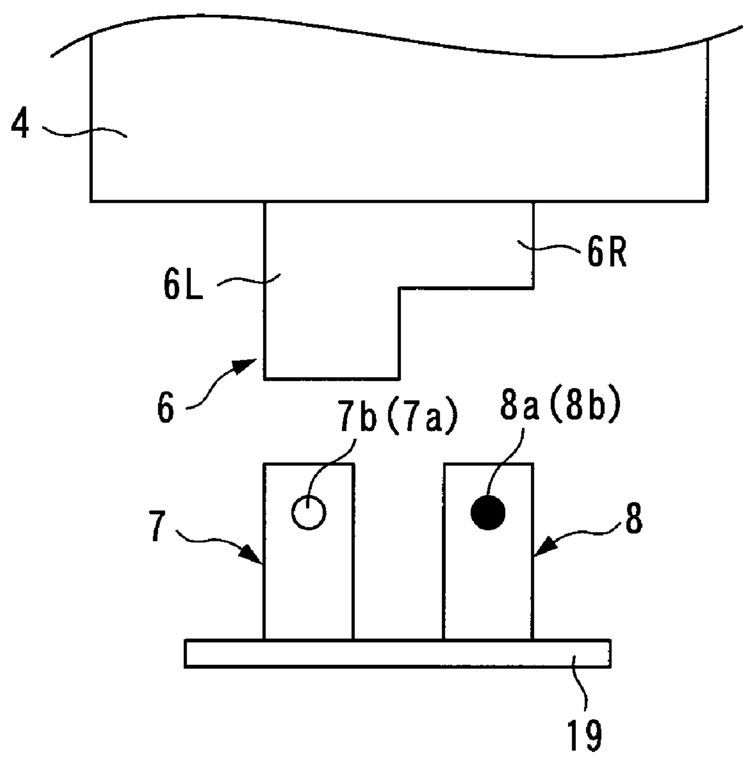
[FIG. 2] A partial enlarged view of FIG. 1.

The shutter 6 has a plate shape and is integrally formed on the lower surface of each key 4 at a location frontward of the balance pin 11 in a manner projecting downward, as shown in FIG. 1. As shown in FIG. 2, the shutter 6 has an inverted L shape formed by a rectangular left half part 6L and a right half part 6R extending rightward from the upper half of the left half part 6L, and therefore the lower end of the right half part 6R is higher than that of the left half part 6L.

The shutter 6 is formed e.g. of a synthetic resin that does not allow light to pass therethrough. The shutter 6 has its whole surfaces treated so as to reduce the amount of light reflected by the shutter 6 (hereinafter referred to as "reflected light"). This surface treatment is realized e.g. by embossing work. The embossing work is performed during molding operation, using a mold having asperities formed thereon in advance for embossing work e.g. by electrical discharge machining or sand blasting treatment. By performing such surface treatment on the shutter 6, surface roughness is increased, whereby the amount of reflected light from the shutter 6 is reduced.

The first and second optical sensors 7 and 8 are implemented by respective photointerrupters identical in construction. As shown in FIGS. 2 to 5, the first optical sensor 7 is comprised of a case 7*c* having a U shape in side view and a pair of a light emitting diode 7*a* (light emitting part) and a phototransistor 7*b* (light receiving part) formed in facing relation to each other in the front-rear direction. Similarly, the second sensor 8 is comprised of a case 8*c* and a pair of a light emitting diode 8*a* (light emitting part) and a phototransistor 8*b* (light receiving part) formed in facing relation to each other in the front-rear direction. The first and second optical sensors 7 and 8 are mounted on a substrate 19 disposed on the keybed 3, with the cases 7*c* and 8*c* erected on the substrate 19.

As shown in FIG. 2, the first and second optical sensors 7 and 8 are disposed below the left half part 6L of the shutter 6 and the right half part 6R of the same, respectively, in a manner arranged side by said in the left-right direction.

Each of the light emitting diodes 7*a* and 8*a* is formed by a pn-connected diode, and has an anode and a cathode thereof electrically connected to the substrate 19. The light emitting diode 7*a* (8*a*) is turned on when a drive signal is delivered from a CPU 23, referred to hereinafter, to its anode, whereby light is emitted from the light emitting diode 7*a* (8*a*). It should be noted that the light emission intensity of the light emitting diode 7*a* (8*a*) changes according to the amount of current supplied to the anode, and increases with an increase in the amount of current.

Each of the phototransistors 7*b* and 8*b* is formed by a pn-connected bipolar transistor, and has a collector and an emitter thereof electrically connected to the substrate 19. The phototransistor 7*b* (8*b*) receives light on a light receiving surface thereof (not shown) as a base, and is turned on and off by this light, whereby the collector and the emitter are made conductive or non-conductive therebetween. Specifically, when the amount of light received on the light receiving surface (hereinafter referred to as "the received light amount") is not lower than a predetermined level, the collector and the emitter are made conductive therebetween, while when the received light amount is below the predetermined level, the collector and the emitter are made non-conductive therebetween.

Figure 3:
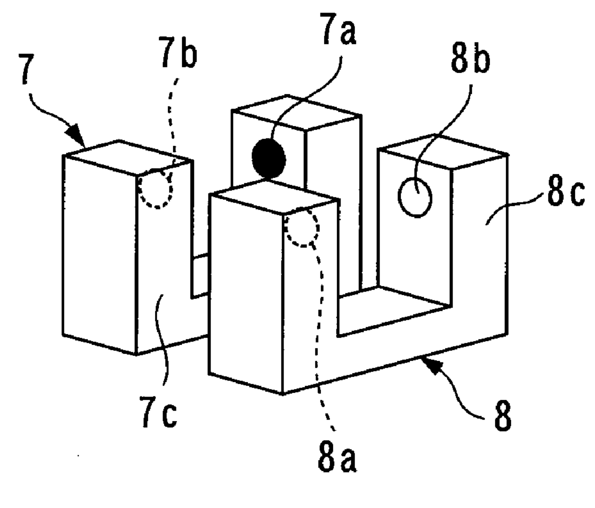
[FIG. 3] A perspective view of first and second optical sensors appearing in FIG. 1.
Figure 4:
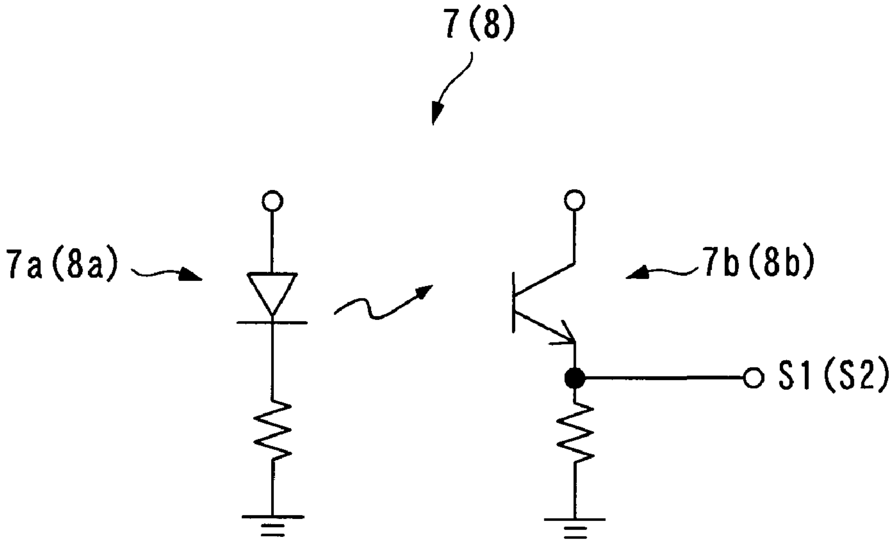
[FIG. 4] A circuit diagram of the first and second optical sensors appearing in FIG. 1.
Figure 5:
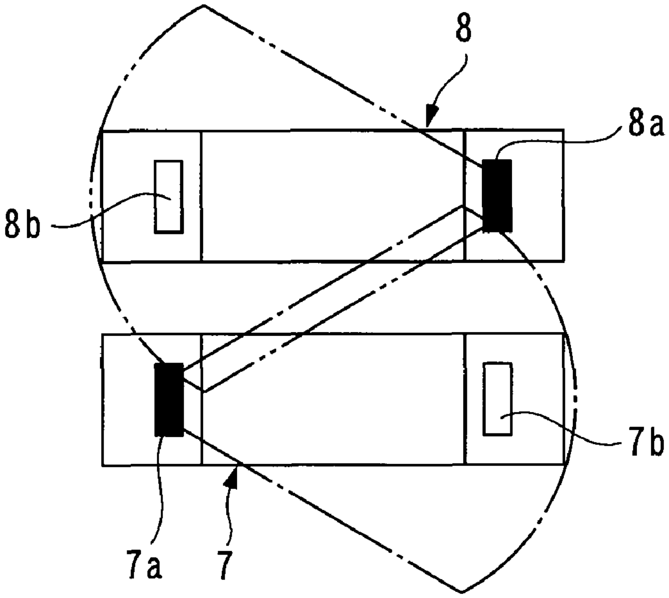
[FIG. 5] A top view of the first and second optical sensors appearing in FIG. 1.

As shown in FIGS. 3 and 5, the first and second optical sensors 7 and 8 are reverse to each other in the positional relation between the light emitting side and the light receiving side. More specifically, the light emitting diode 7*a* of the first optical sensor 7 and the phototransistor 8*b* of the second optical sensor 8 are arranged adjacent to each other at a location rearward of the pivotal path of the shutter 6, while the phototransistor 7*b* of the first optical sensor 7 and the light emitting diode 8*a* of the second optical sensor 8 are arranged adjacent to each other at a location frontward of the pivotal path. With this arrangement, as shown in FIG. 5, the light emitting diode 7*a* emits light forward, whereas the light emitting diode 8*a* emits light rearward. The phototransistor 7*b* receives light from the light emitting diode 7*a* on its light receiving surface and converts the received light into an electric signal, while the phototransistor 8*b* receives light from the light emitting diode 8*a* on its light receiving surface and converts the received light into an electric signal. These electric signals are output as first and second detection signals S1 and S2 dependent on the pivotal position of the associated key 4.

Specifically, when an optical path connecting between the light emitting diode 7*a* (8*a*) and the light receiving surface of the phototransistor 7*b* (8*b*) is opened to thereby allow light reception on the light receiving surface, the amount of light received on the light receiving surface becomes equal to or larger than the predetermined level, which makes the collector and the emitter of the phototransistor 7*b* (8*b*) conductive therebetween, whereby a H-level signal is output from the emitter. On the other hand, when the optical path is blocked to thereby inhibit light reception on the light receiving surface, the amount of light received on the light receiving surface becomes lower than the predetermined level, which makes the collector and the emitter non-conductive therebetween, whereby an L-level signal is output from the emitter.

Further, as shown in FIG. 1, a stopper 18 is disposed between the hammer 5 and the string S. The stopper 18 is configured to inhibit striking of the string S by the hammer 5 in the silent performance mode. The stopper 18 is comprised of a body part 18*a* and a cushion (not shown) attached to a front end surface of the body part 18*a*. The stopper 18 has a base part thereof pivotally supported by a pivot 18*b*, and is driven by a motor (not shown). In the normal performance mode, the stopper 18 is driven into a retreat position (indicated by solid lines in FIG. 1) where the stopper 18 extends vertically to be retreated from the range of pivotal motion of the hammer shank 5*b* of the hammer 5, whereas in the silent performance mode, the stopper 18 is driven to extend in the front-rear direction into an entry position (indicated by dotted lines in FIG. 1) where the stopper 18 has entered the range of pivotal motion of the hammer shank 5*b*. It should be noted that this motor is driven by a drive signal from the CPU 23.

With the above arrangement, when the key 4 is depressed, the key 4 pivotally moves about the balance pin 11 in the clockwise direction as viewed in FIG. 1, and in accordance with this pivotal motion, the wippen 13 pivotally moves counterclockwise. In accordance with the pivotal motion of the wippen 13, the jack 14 moves upward along with the wippen 13 to push up the butt 5*a* by the hammer push-up part 14*a*, whereby the hammer 5 performs pivotal motion in the counterclockwise direction. In the normal performance mode, since the stopper 18 is driven into the retreat position, the hammer head 5*c* strikes the string S. On the other hand, in the silent performance mode, since the stopper 18 is driven into the entry position, the hammer shank 5*b* abuts against the stopper 18 immediately before the hammer head 5*c* strikes the string S, to inhibit striking of the string S. Further, in accordance with the pivotal motion of the key 4, the shutter 6 opens and closes the optical paths of the respective first and second optical sensors 7 and 8, and in accordance therewith, the first and second detection signals S1 and S2 are output.

Figure 6:
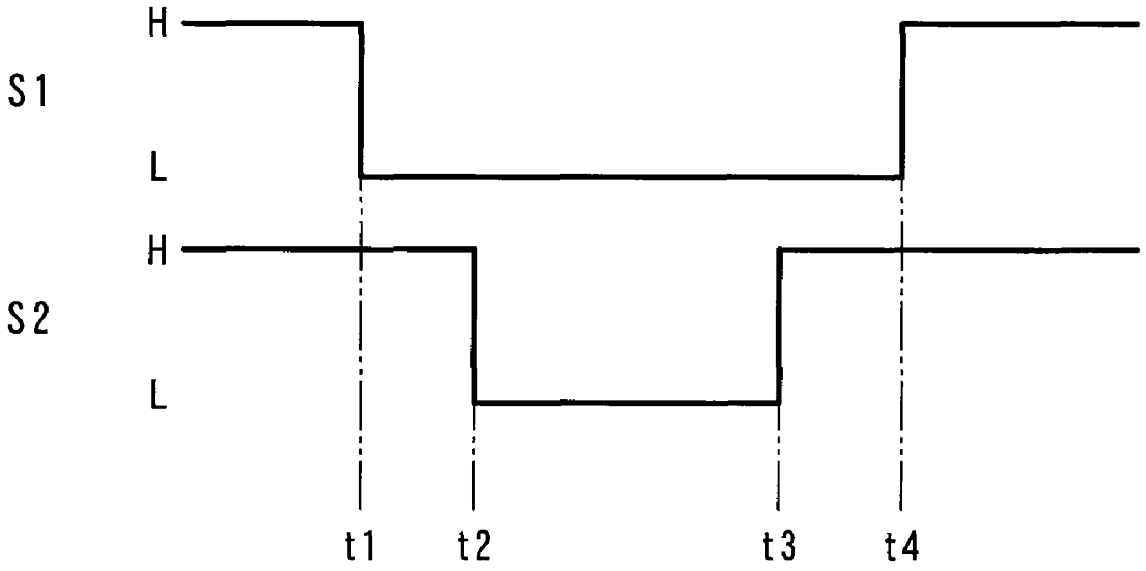
[FIG. 6] A timing diagram of first and second detection signals output during key depression and key release.

FIG. 6 is a timing diagram of the first and second detection signals S1 and S2 output in accordance with pivotal motion of the key 4. First, in the key-released state shown in FIG. 1, the shutter 6 opens the optical paths of the respective first and second optical sensors 7 and 8, whereby the first and second detection signals S1 and S2 are both held at the H level. When the key 4 is depressed in this key-released state, the shutter 6 moves downward in accordance with the key depression, and when the left half part 6L of the shutter 6 reaches the optical path of the first optical sensor 7, the optical path of the first optical sensor 7 is blocked, whereby the first detection signal S1 falls from the H level to the L level (t1). When the shutter 6 further moves downward and the left half part 6L of the shutter 6 reaches the optical path of the second optical sensor 8, the optical path of the second optical sensor 8 is blocked, whereby the second detection signal S2 falls from the H level to the L level (t2). Thereafter, when the key 4 is released, the key 4 performs pivotal return motion in a direction reverse to the direction in which the key is depressed. During this pivotal return motion, the optical path of the second optical sensor 8 is opened, whereby the second detection signal S2 rises from the L level to the H level (t3), and when the pivotal return motion further advances, the optical path of the first optical sensor 7 is opened, whereby the first detection signal S1 rises from the L level to the H level (t4).

Figure 7:
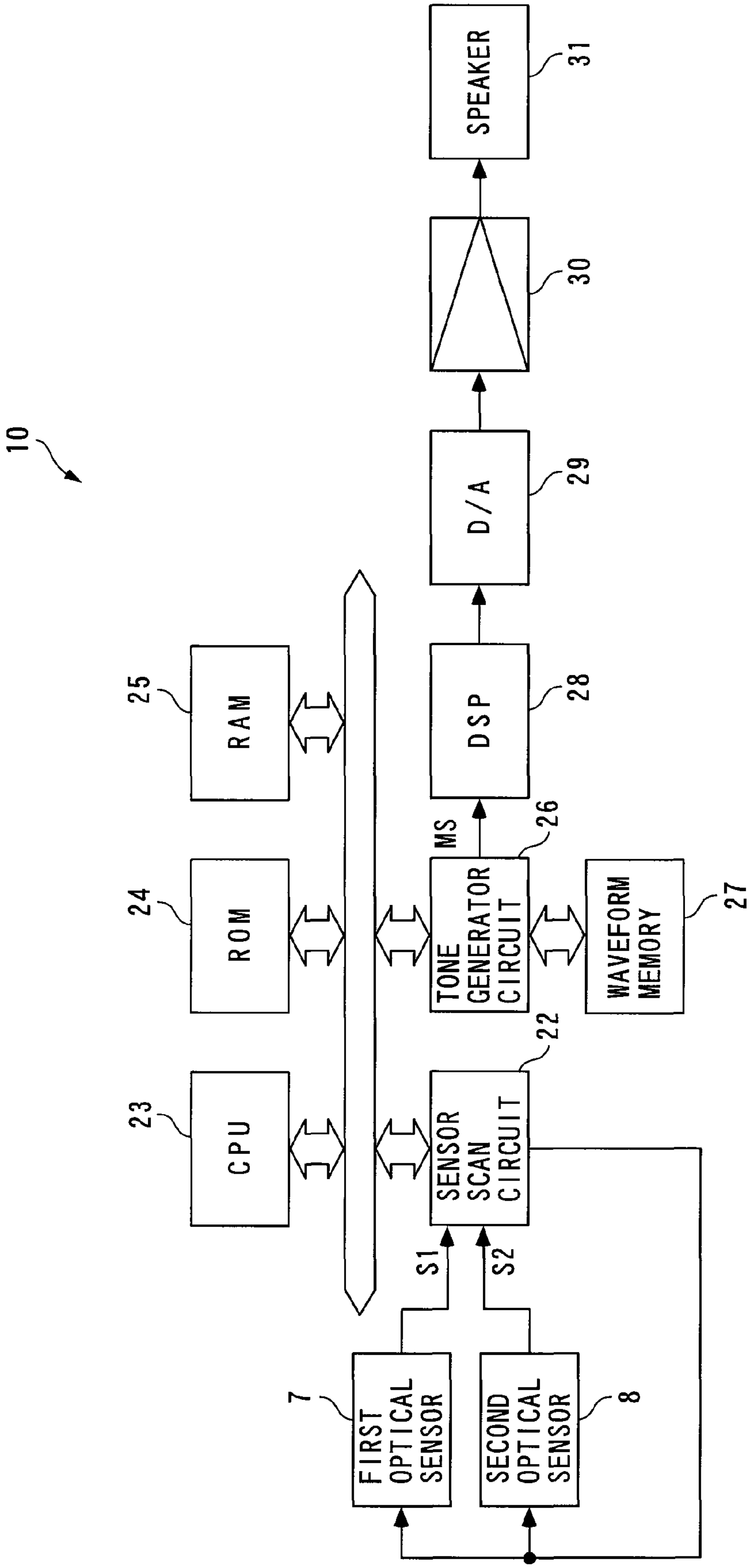
[FIG. 7] A partial diagram of a musical tone generator appearing in FIG. 1.

The musical tone generator 10 is configured to generate musical tones in the silent performance mode. As shown in FIG. 7, the musical tone generator 10 is comprised of a sensor scan circuit 22, the CPU 23, a ROM 24, a RAM 25, a tone generator circuit 26, a waveform memory 27, a DSP 28, a D/A converter 29, a power amplifier 30, and a speaker 31. The sensor scan circuit 22 detects ON/OFF information of a key 4 and key number information for identifying the key 4 turned on or off, based on the first and second detection signals S1 and S2 output from the associated first and second optical sensors 7 and 8, and outputs the ON/OFF information and the key number information to the CPU 23 together with the first and second detection signals S1 and S2, as key depression information data of the key 4. Further, the sensor scan circuit 22 includes a downcounter (not shown) for counting time between a time point when the first detection signal S1 has fallen from the H level to the L level and a time point when the second detection signal S2 has fallen from the H level to the L level, and outputs a count value cnt of the downcounter to the CPU 23.

The ROM 24 stores not only control programs to be executed by the CPU 23, but also fixed data for controlling tone volume and so forth. The RAM 25 not only temporarily stores status information indicative of an operational status in the silent performance mode, and other information, but also is used as a work area for the CPU 23.

The tone generator circuit 26 reads out sound source waveform data and envelope data from the waveform memory 27 according to a control signal from the CPU 23, and adds the envelope data to the read-out source waveform data to thereby generate a musical tone signal MS as an original tone. The DSP 28 imparts a predetermined acoustic effect to the musical tone signal MS generated by the tone generator circuit 26. The D/A converter 29 converts the musical tone signal MS having the acoustic effect imparted by the DSP 28, as a digital signal, to an analog signal. The power amplifier 30 amplifies the analog signal obtained through the conversion, by a predetermined gain, and the speaker 31 reproduces the amplified analog signal and outputs the reproduced analog signal as a musical tone.

The CPU 23 constitutes touch information detecting means in the present embodiment, and controls the operation of the musical tone generator 10 in the silent performance mode. The CPU 23 determines sounding timing and sounding stop timing according to the first and second detection signals S1 and S2 from the first and second optical sensors 7 and 8, and at the same time determines a velocity for controlling tone volume according to a key depression speed V of an associated key 4.

Figure 8:
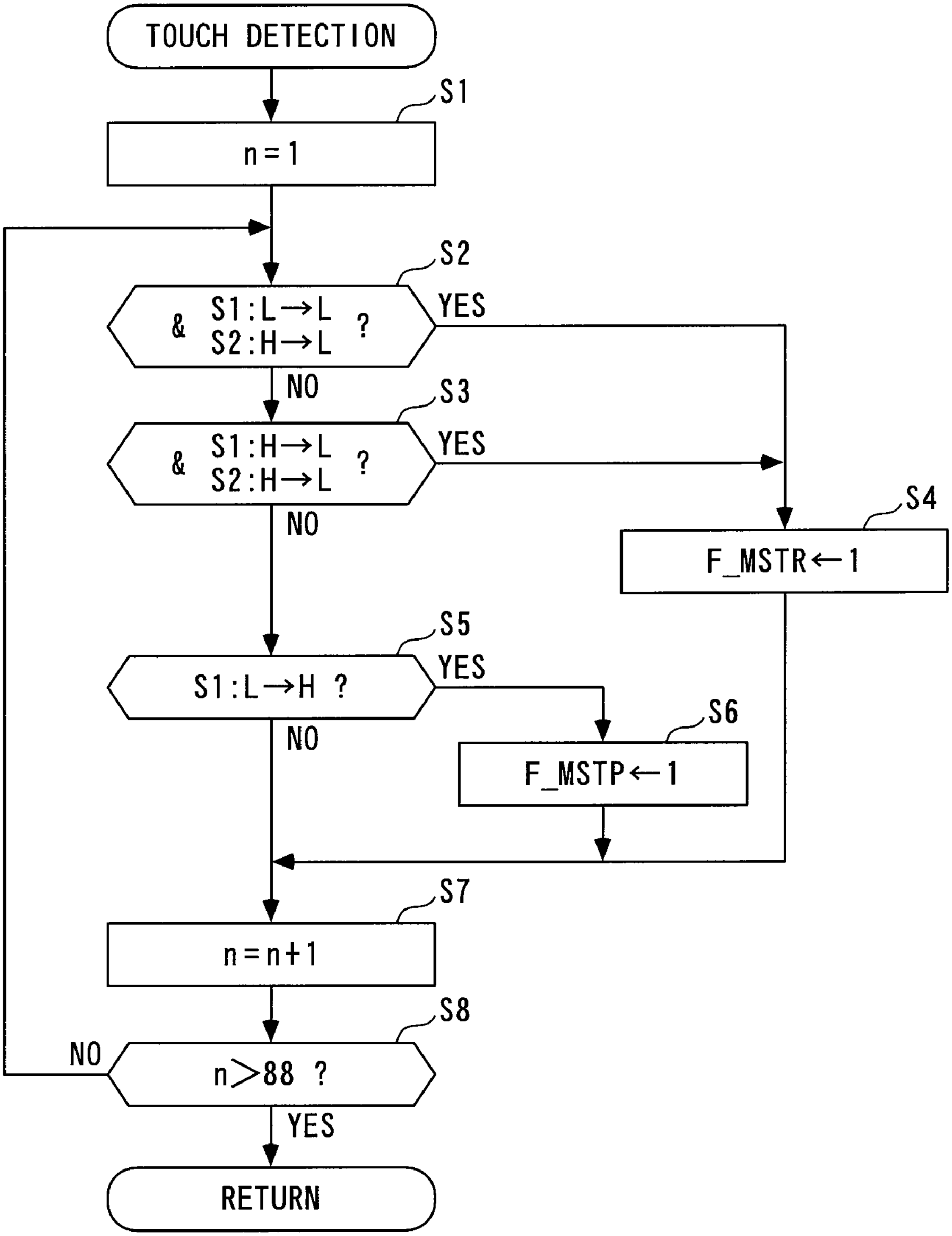
[FIG. 8] A flowchart of a process for determining sounding timing and sounding stop timing, which is executed by a CPU appearing in FIG. 7.

FIG. 8 is a flowchart of a process for determining sounding timing and sounding stop timing. The present process is executed sequentially for all the eighty-eight keys. In the present process, first in a step 1 (shown as S1 in abbreviated form in FIG. 8; the following steps are also shown in abbreviated form), the key number n (n=1 to 88) indicative of a key 4 is initialized to a value of 1.

Then, it is determined whether or not, during a time period between the immediately preceding loop and the present loop, the first detection signal S1 of the first optical sensor 7 is held at the L level, and the second detection signal S2 of the second optical sensor 8 has changed from the H level to the L level (step 2). If the answer to the question is affirmative (YES), i.e. when the optical path of the first optical sensor 7 is kept blocked by the shutter 6 and it is immediately after the optical path of the second optical sensor 8 has been blocked (t2 in FIG. 6), it is judged that the key 4 has been depressed, and a sounding start flag F_MSTR is set to "1" so as to start sounding (step 4).

If the answer to the question of the step 2 is negative (NO), it is determined whether or not, during the time period between the immediately preceding loop and the present loop, the first and second detection signals S1 and S2 have both changed from the H level to the L level (step 3). If the answer to the question is affirmative (YES), i.e. if the optical paths of the respective first and second optical sensors 7 and 8 have both been blocked, it is judged that the key 4 has been strongly depressed, and the process proceeds to the step 4, wherein the sounding start flag F_MSTR is set to "1". When the sounding start flag F_MSTR is thus set to "1", a control signal for starting sounding is output to the tone generator circuit 26, whereby a sounding starting operation is started.

On the other hand, if the answer to the question of the step 3 is negative (NO), it is determined whether or not the first detection signal S1 has changed from the L level to the H level (step 5). If the answer to the question is affirmative (YES), i.e. if it is immediately after the optical path of the first optical sensor 7 has been opened (t4 in FIG. 6), it is judged that the key 4 has been released, so that a sounding stop flag F_MSTP is set to "1" so as to stop sounding (step 6). When the sounding stop flag F_MSTP is set to "1", a control signal for stopping sounding is output to the tone generator circuit 26, whereby a sounding stopping operation is started.

On the other hand, if the answer to the question of the step 5 is negative (NO), or after execution of the step S4 or S6, the key number n is incremented (step 7). Then, it is determined whether or not the incremented key number n is larger than a value of 88 (step 8). If the answer to this question is negative (NO), i.e. if $n \leqq 88$ holds, the process returns to the step 2, and then the steps 2 et seq. are executed. On the other hand, if the answer to the question of the step 8 is affirmative (YES), i.e. $n>88$ holds, which means that the above-described process has been completely executed for all the eighty-eight keys, the present process is terminated.

Figure 9:
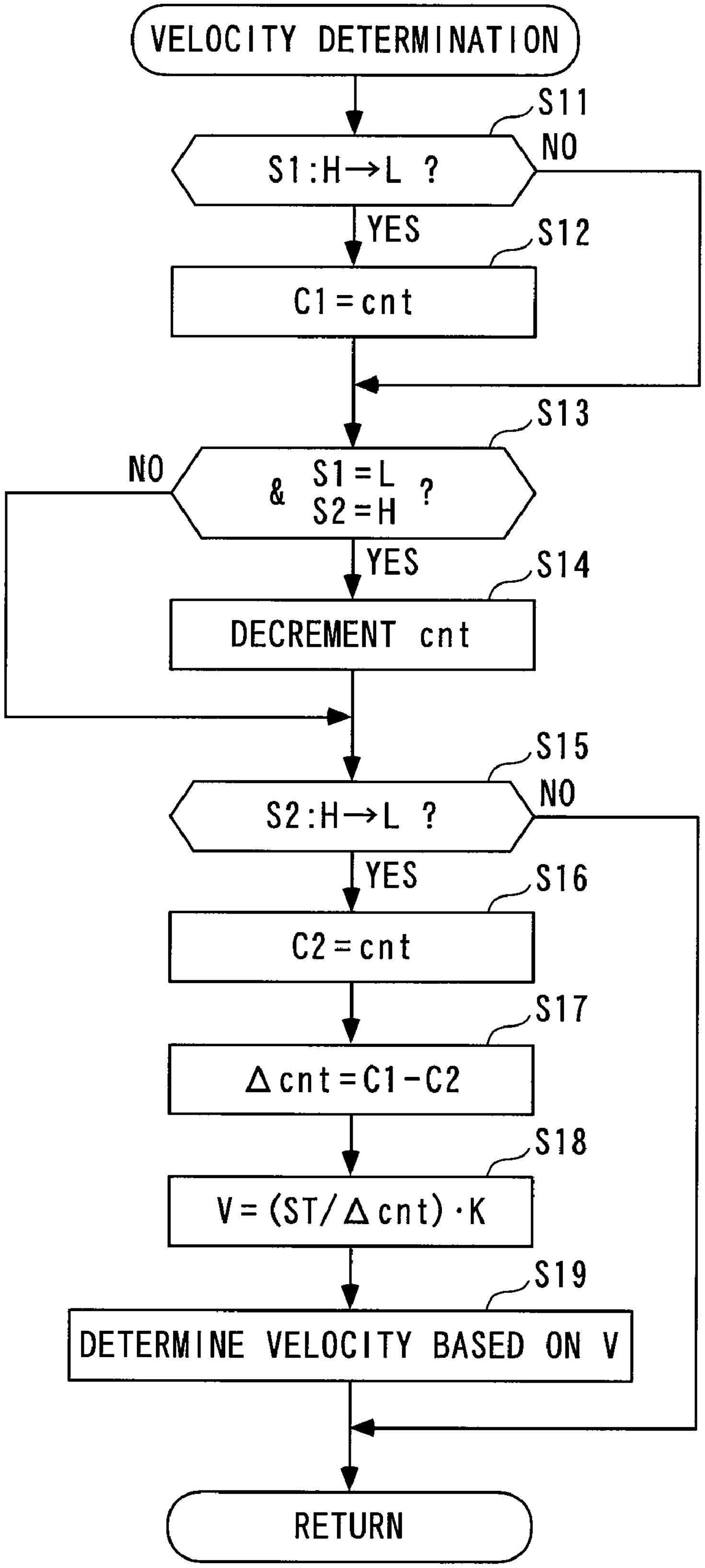
[FIG. 9] A flowchart of a velocity-determining process which is executed by the CPU appearing in FIG. 7

FIG. 9 is a flowchart of the velocity-determining process. In the present process, first, it is determined whether or not the first detection signal S1 has changed from the H level to the L level (step 11). If the answer to the question is affirmative (YES), i.e. if it is immediately after the shutter 6 has blocked the optical path of the first optical sensor 7 (t1 in FIG. 6), the counter value cnt at the time is set as a first counter value C1 (step 12), and then the process proceeds to a step 13.

On the other hand, if the answer to the question of the step 11 is negative (NO), i.e. if the first detection signal S1 has not changed from the H level to the S level, the step 12 is skipped, and the process proceeds to the step 13. In this step 13, it is determined whether or not the first detection signal S1 is at the L level, and at the same time, the second detection signal S2 is at the H level. If the answer to this question is affirmative (YES), i.e. if the shutter 6 has blocked the optical path of the first optical sensor 7 but has not blocked the optical path of the second optical sensor 8 yet, the counter value cnt is decremented (step 14), and the process proceeds to a step 15.

On the other hand, if the answer to the question of the step 13 is negative (NO), the step 14 is skipped, and the process proceeds to the step 15 without decrementing the counter value cnt. In the step 15, it is determined whether or not the second detection signal S2 has changed from the H level to the L level. If the answer to this question is negative (NO), the present process is terminated.

On the other hand, if the answer to the question of the step 15 is affirmative (YES), i.e. if it is immediately after the optical path of the second optical sensor 8 has been blocked (t2 in FIG. 6), the counter value cnt is set as a second count value C2 (step 16).

Next, the difference ⊿cnt (C1−C2) between the first counter value C1 and the second counter value C2 is calculated (step 17). As is apparent from the above-described calculation method, the difference ⊿cnt corresponds to a time period which it takes the shutter 6 to block the optical path of the second optical sensor 8 after having blocked the optical path of the first optical sensor 7, and is inversely proportional to the key depression speed V of the key 4. Then, a pivotal stroke ST between the first and second optical sensors 7 and 8 is divided by the difference ⊿cnt, and a value obtained by the division is multiplied by a predetermined coefficient K to thereby calculate the key depression speed V of the key 4 (step 18). The coefficient K is for conversion of the difference ⊿cnt into time. Then, a velocity is determined (step 19) based on the key depression speed V calculated in the step 18, followed by terminating the present process.

Although in the above example, the velocity-determining process is executed by the CPU 23 based on key depression information data from the sensor scan circuit 22, the velocity-determining process may be executed by a dedicated detection means for detecting key depression information data and determining a velocity based on the detected key depression information data, for example, a large-scale integrated circuit, such as an LSI, in place of the sensor scan circuit 22 and the CPU 23. This makes it possible to reduce load on the CPU 23.

As described above, according to the present embodiment, the light emitting diode 7*a* of the first optical sensor 7 and the phototransistor 8*b* of the second optical sensor 8 are arranged rearward of the pivotal path of the shutter 6, while the phototransistor 7*b* of the first optical sensor 7 and the light emitting diode 8*a* of the second optical sensor 8 are arranged frontward of the pivotal path. Therefore, as shown in FIG. 5, light from the light emitting diode 7*a* cannot reach the phototransistor 8*b* to be received by the same, and light from the light emitting diode 8*a* cannot reach the phototransistor 7*b* to be received by the same, either.

Therefore, light from the light emitting diode 8*a* is prevented from being received by the phototransistor 7*b* in a state where only the optical path of the light emitting diode 7*a* is closed by the shutter 6, and consequently, differently from the prior art, the present embodiment makes it possible to cause the fall time t1 of the first detection signal S1 and the rise time t4 of the same to coincide with respective actual closing and opening timings in which the optical path is closed and opened by the shutter 6, to thereby perform accurate detection. Therefore, even when light beams emitted from the respective light emitting diodes 7*a* and 8*a* are divergent, without being affected by the other optical sensors, it is possible to detect key depression timing and key release timing with high accuracy to thereby properly determine sounding timing and sounding stop timing, as well as accurately detect the key depression speed V. In short, touch information of the key 4 can be detected with high accuracy.

Further, for the same reasons, it is possible to obtain the following advantageous effects:

1. Irrespective of the position of passage of the shutter 6 between the light emitting diode 7*a* and the phototransistor 7*b* of the first optical sensor 7, it is possible to cause the fall time and the rise time of the first detection signal S1 to coincide with respective actual closing and opening timings in which the optical path is closed and opened by the shutter 6, to thereby perform accurate detection.

2. Even when the distance between the first and second optical sensors 7 and 8 is reduced, the first and second detection signals S1 and S2 are not affected by reduction of the distance, so that by reducing the distance, it is possible to enhance the mounting density of the first and second optical sensors 7 and 8, and due to reduced length of a section for detecting the key depression speed V, detect a key depression speed V immediately before striking of the string S, which is important as key depression information, with high accuracy, for example.

3. Even when light emission intensity is set to a high level, the first and second detection signals S1 and S2 are not affected by the high-level light emission intensity, and therefore it is possible to stabilize the outputs from the respective first and second optical sensors 7 and 8 by the setting, to thereby detect touch information of the key 4 with further enhanced accuracy.

Furthermore, the shutter 6 is surface-treated so as to reduce the amount of reflected light, so that when light from the light emitting diode 8*a* of the second optical sensor 8 is reflected on the shutter 6 in a state where the optical path of the first optical sensor 7 is closed, the amount of the reflected light is reduced by the shutter 6. Therefore, even if the reflected light reaches the phototransistor 7*b* of the first optical sensor 7, it is possible to reliably eliminate the adverse influence of the reflected light. What is more, even in a state where the optical paths of the first and second sensors 7 and 8 are both closed by the shutter 6, when light from the light emitting diode 7*a* of the first optical sensor 7 is reflected on the shutter 6, the amount of the reflected light is reduced, so that it is possible to reliably eliminate the adverse influence of the reflected light on the second optical sensor 8.

Figure 10:
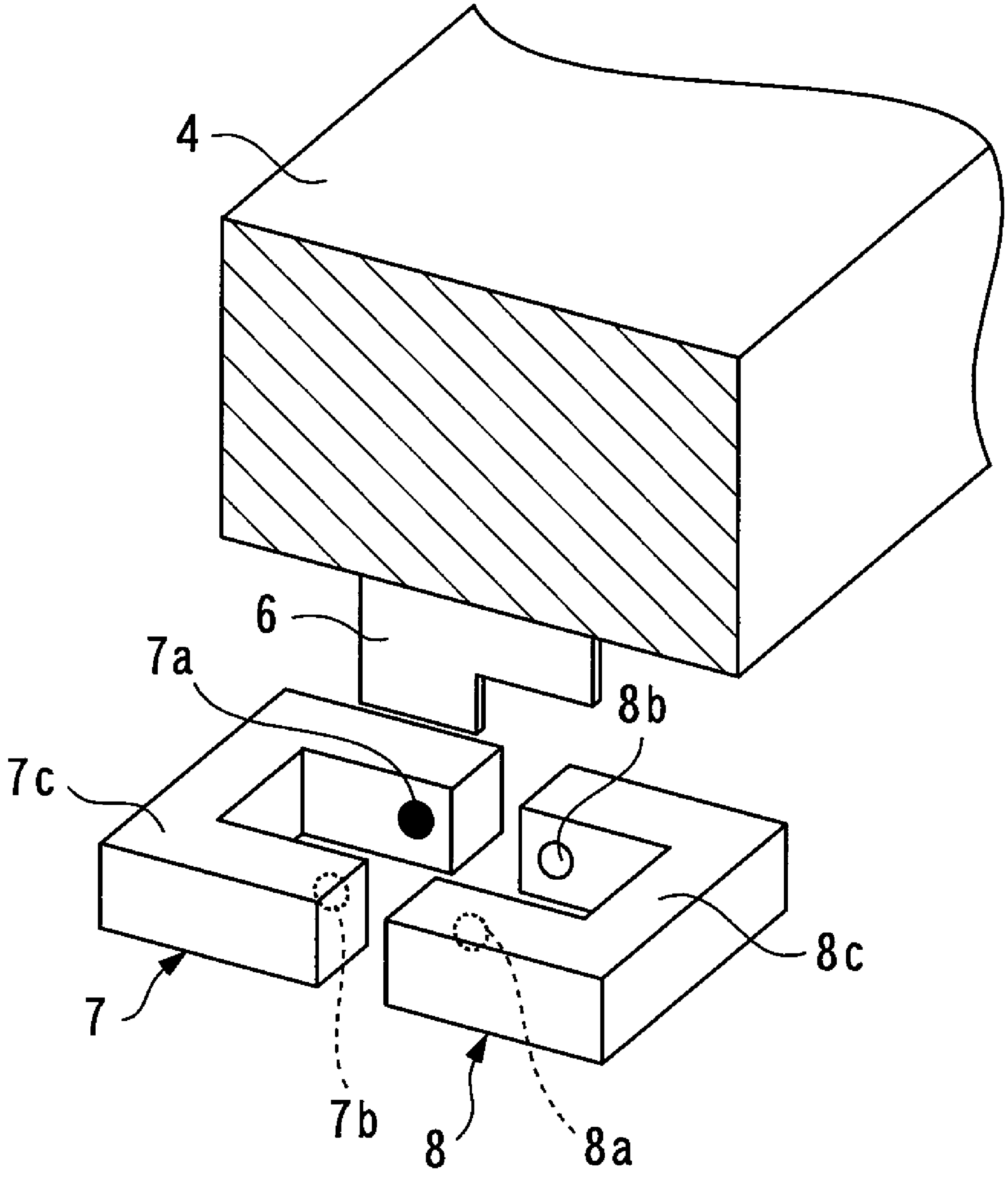
[FIG. 10] A partial perspective view of a variation of the first embodiment.

FIG. 10 shows a variation of the first embodiment. This variation is distinguished from the first embodiment shown in FIGS. 2 and 3, in which the first and second sensors 7 and 8 are erected on the substrate 19 (see FIG. 2) on the keybed 3, only in that the first and second sensors 7 and 8 are disposed in a state fallen on the substrate 19, with open sides of the respective cases 7*c* and 8*c* opposed to each other. In the present variation as well, similarly to the first embodiment, the light emitting diode 7*a* of the first optical sensor 7 and the phototransistor 8*b* of the second optical sensor 8 are arranged adjacent to each other at a location rearward of the pivotal path of the shutter 6, while the phototransistor 7*b* of the first optical sensor 7 and the light emitting diode 8*a* of the second optical sensor 8 are arranged adjacent to each other at a location frontward of the pivotal path.

With this arrangement, since light from the light emitting diode 8*a* of the second optical sensor 8 cannot reach the phototransistor 7*b* of the first optical sensor 7 to be received by the same, it is possible to provide quite the same advantageous effect as provided by the first embodiment. Further, in the present variation, since the first and second sensors 7 and 8 are disposed in a fallen state, a space between the keybed 3 and the key 4 can be reduced, which makes it possible to reduce the size of the body of the keyboard apparatus.

Figure 11:
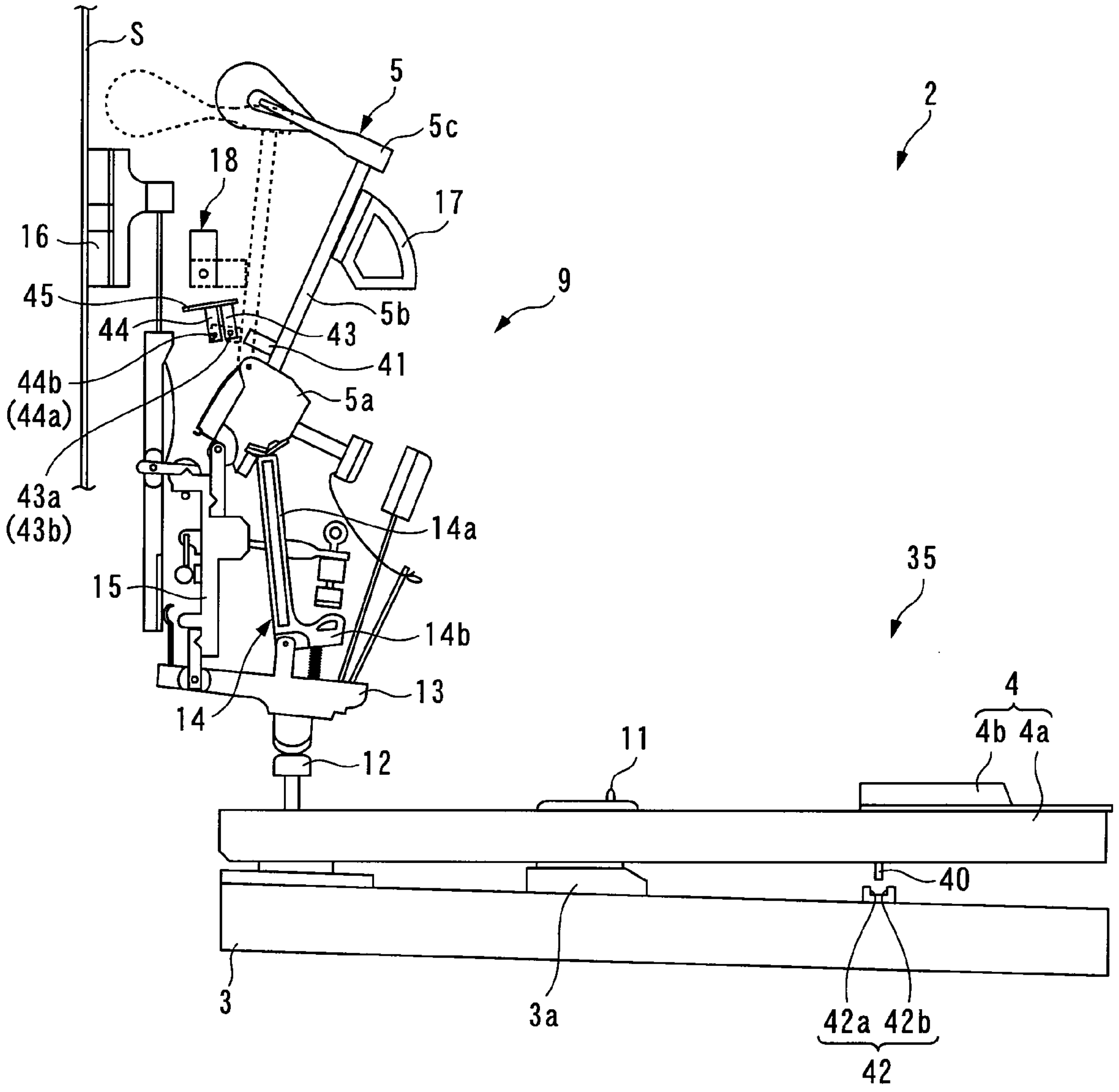
[FIG. 11] A schematic view of a touch detecting device according to a second embodiment of the present invention and a silent piano to which is applied the touch detecting device.

FIG. 11 shows a touch detecting device 35 according to a second embodiment of the present invention. It should be noted that in the following description, component parts thereof identical to those of the first embodiment are designated by identical reference numerals, and detailed description thereof is omitted. As shown in FIG. 11, the touch detecting device 35 includes a first shutter 40 attached to the key 4 and a second shutter 41 attached to the hammer 5.

Similarly to the shutter 6 in the first embodiment, the first shutter 40 is formed to have a rectangular plate shape and is attached to a lower surface of the key 4 in a manner extending downward. A first optical sensor 42 is disposed under the first shutter 40. The first optical sensor 42 is identical in construction to the first and second optical sensors 7 and 8 in the first embodiment. The first optical sensor 42 is comprised of a pair of a light emitting diode 42*a* and a phototransistor 42*b*. The light emitting diode 42*a* and the phototransistor 42*b* are electrically connected to the substrate 19 (see FIG. 2).

The second shutter 41 is formed to have a rectangular plate shape, and is secured to a rear surface of the hammer shank 5*b* of the hammer 5 such that it extends rearward, as shown in FIG. 11. Similarly to the shutter 6 in the first embodiment, the second shutter 41 is surface treated so as to reduce the amount of reflected light therefrom. At a predetermined location rearward of the second shutter 41, there are arranged second and third optical sensors 43 and 44.

The second and third optical sensors 43 and 44 are mounted on a substrate 45. Similarly to the first optical sensor 42, the second and third optical sensors 43 and 44 are comprised of a pair of a light emitting diode 43*a* and a phototransistor 43*b* and a pair of a light emitting diode 44*a* and a phototransistor 44*b*, respectively. The second and third optical sensors 43 and 44 are arranged side by side in the front-rear direction along the pivotal path of the second shutter 41. The substrate 45 is mounted at a predetermined location on a mounting rail (not shown) in a state tilted through a predetermined angle. The mounting rail extends between brackets (not shown) provided at respective left and right ends of the keybed 3.

The light emitting diode 43*a* of the second optical sensor 43 and the phototransistor 44*b* of the third optical sensor 44 are arranged adjacent to each other at a location rightward of the pivotal path of the second shutter 41, while the phototransistor 43*b* of the second optical sensor 43 and the light emitting diode 44*a* of the third optical sensor 44 are arranged adjacent to each other at a location leftward of the pivotal path. The light emitting diodes 43*a* and 44*a* emit light beams toward the respective phototransistors 43*b* and 44*b*, and the phototransistors 43*b* and 44*b* receive the light beams from the light emitting diodes 43*a* and 44*a*, on respective light receiving surfaces thereof. The phototransistors 43*b* and 44*b* convert the received light beams into respective electric signals and outputs the electric signals as second and third detection signals S12 and S13, respectively, to the sensor scan circuit 22.

Figure 12:
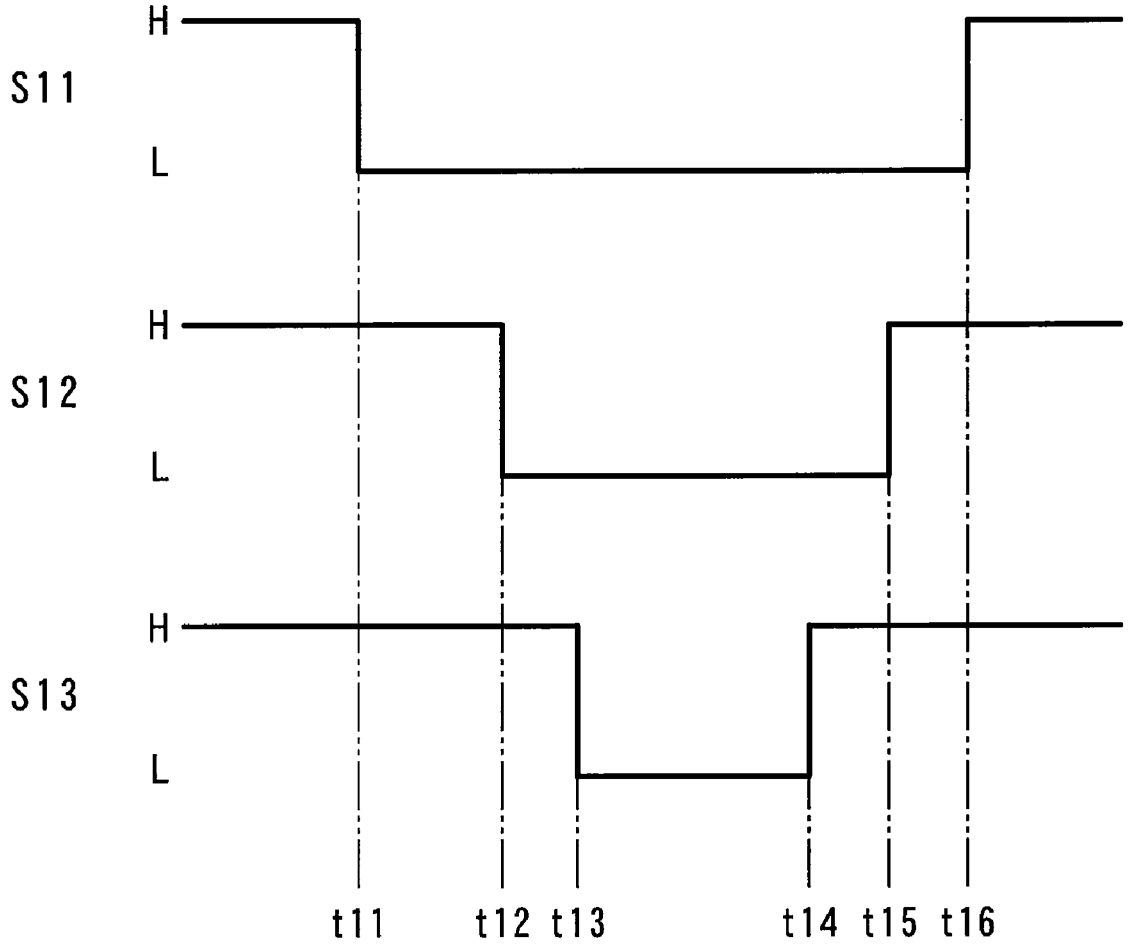
[FIG. 12] A timing diagram of first to third detection signals output during key depression and key release.

FIG. 12 is a timing diagram of the first to third detection signals S11 to S13 output in accordance with pivotal motion of the key 4. First, in the key-released state shown in FIG. 11, the first shutter 40 opens the optical path of the first optical sensor 42, and the second shutter 41 opens the optical paths of the respective second and third optical sensors 43 and 44, whereby the first to third detection signals S11 to S13 are all held at the H level. When the key 4 is depressed in this key-released state, the first shutter 40 pivotally moves downward in accordance with the key depression. When the first shutter 40 reaches the optical path of the first optical sensor 42 at an early stage of the pivotal motion, the optical path is blocked, whereby the first detection signal S11 falls from the H level to the L level (t11).

As the hammer 5 pivotally moves counterclockwise, as viewed in FG. 11, in accordance with the key depression, the second shutter 41 pivotally moves along with the hammer 5. When the second shutter 41 reaches the optical path of the second optical sensor 43 during the pivotal motion, the optical path is blocked, whereby the second detection signal S12 falls from the H level to the L level (t12). When the second shutter 41 further moves, the optical path of the third optical sensor 44 is blocked by the second shutter 41 immediately before the hammer shank 5*b* abuts against the stopper 18, whereby the third detection signal S13 falls from the H level to the L level (t13).

Thereafter, when the key 4 is released, the key 4 and the hammer 5 perform pivotal return motions in respective directions reverse to those during the key depression. During the pivotal return motions, the optical paths of the third and second optical sensors 44 and 43 are sequentially opened in the mentioned order, whereby the third detection signal S13 and the second detection signal S12 sequentially rise from the L level to the H level (t14 and t15). When the pivotal return motions further advance, the optical path of the first optical sensor 42 is opened, whereby the first detection signal S11 rises from the L level to the H level (t16).

Figure 13:
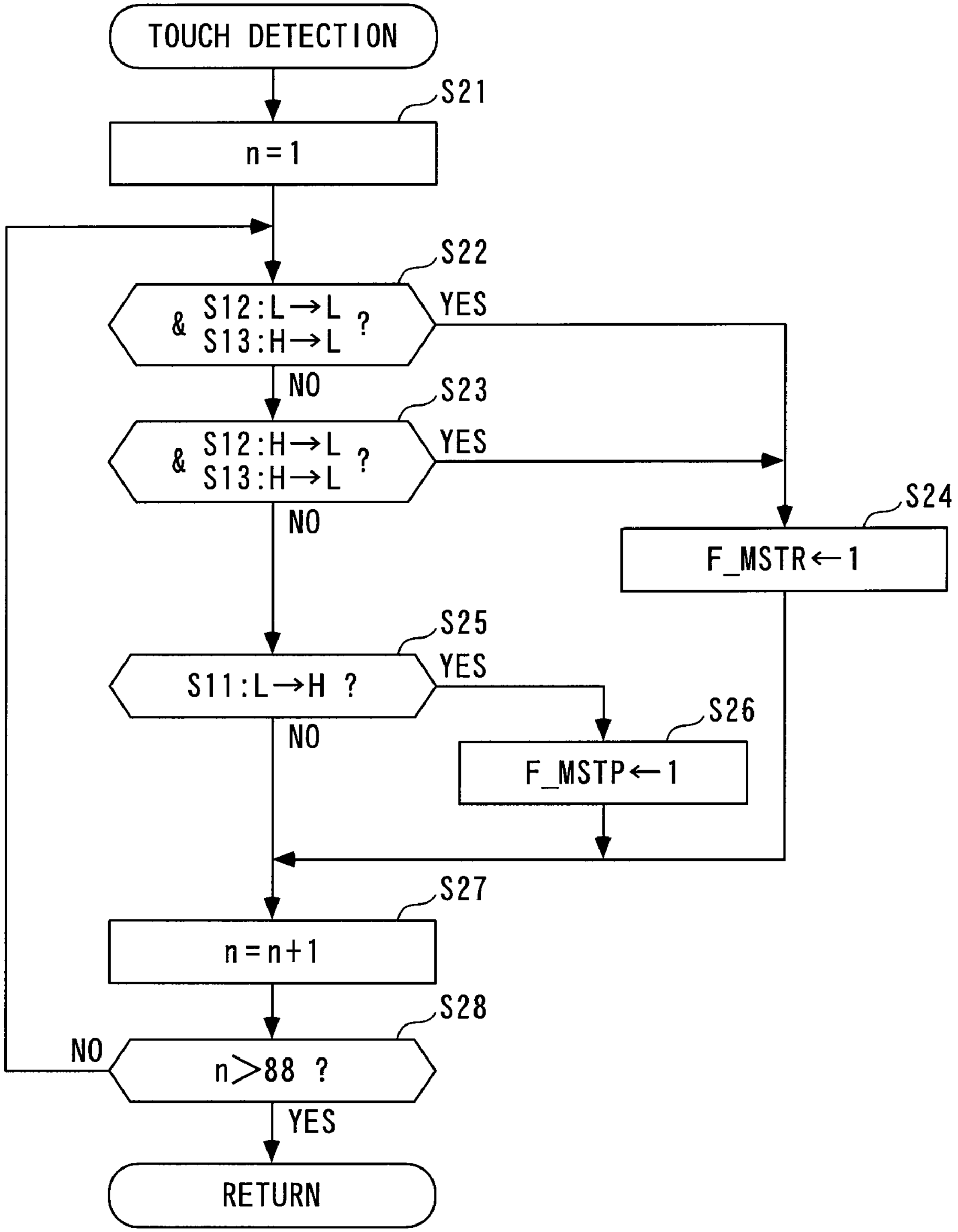
[FIG. 13] A flowchart of a process for determining sounding timing and sounding stop timing, which is executed by the CPU appearing in FIG. 7.
Figure 14:
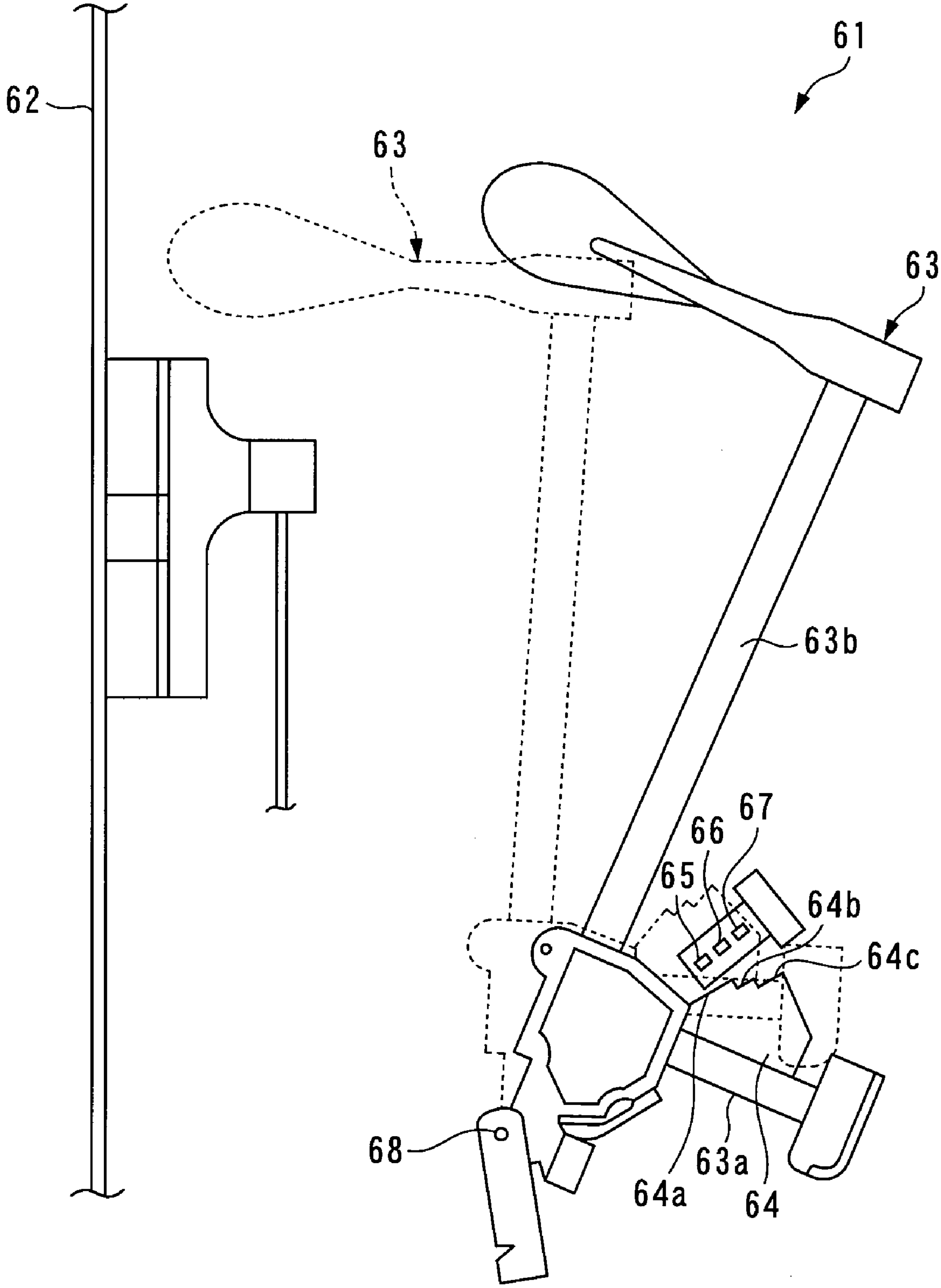
[FIG. 14] A partial side view of a conventional touch detecting device and an automatic performance piano to which is applied the touch detecting device.
Figure 15:
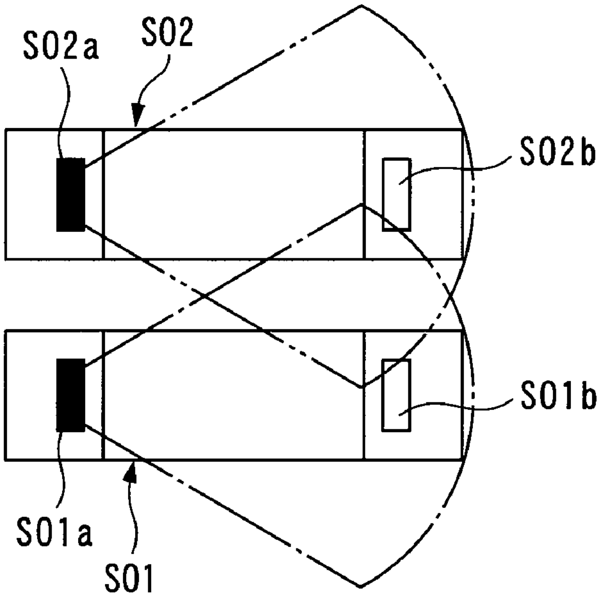
[FIG. 15] Schematic views showing (a) how light beams are emitted from light emitting parts of respective first and second sensors and (b) a manner in which the light beam from the light emitting part of the first sensor is blocked by a shutter.
Figure 15:
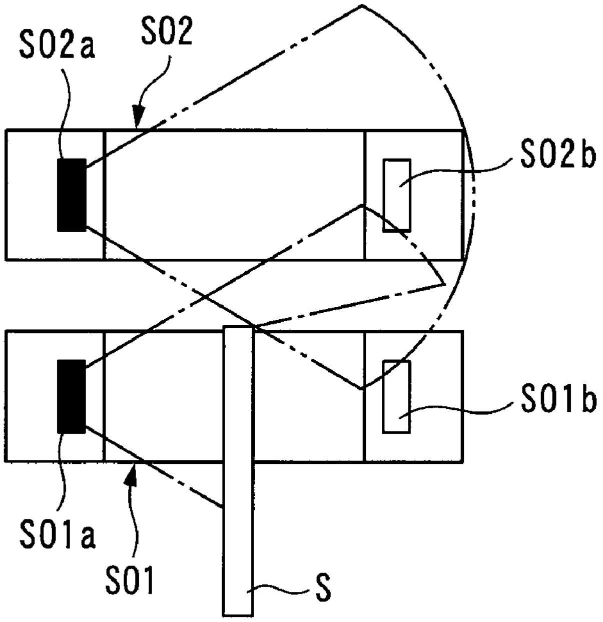
Figure 16:
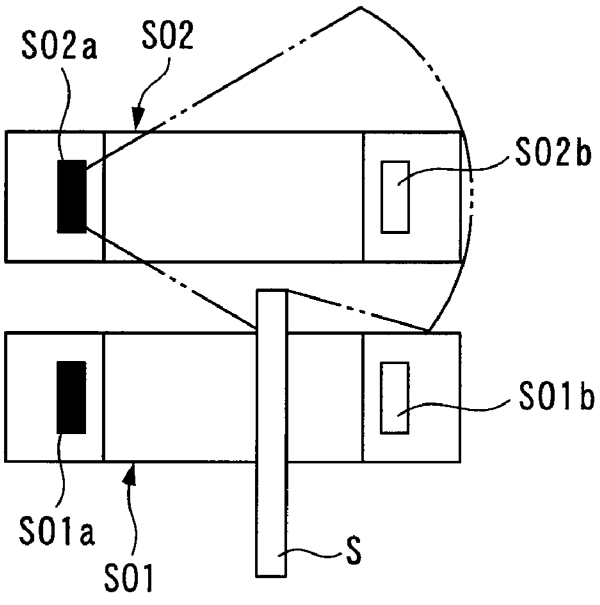
[FIG. 16] Schematic views showing a manner in which the light beam from the light emitting part of the first sensor is blocked (a) when a position of passage of the shutter is close to light receiving parts and (b) when the position of passage of the shutter is close to the light emitting parts.
Figure 16:
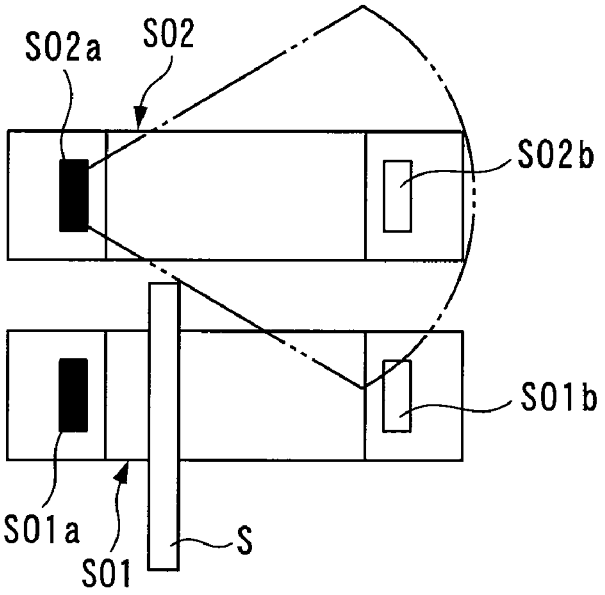

FIG. 13 is a flowchart of a process for determining sounding timing and sounding stop timing according to the first to third detection signals S11 to S13. In the present process, sounding timing is determined according to the second and third detection signals S12 and S13, and sounding stop timing is determined according to the first detection signal S11.

In the present process, first in a step 1, the key number n indicative of a key 4 is initialized to a value of 1 as in the step 1 appearing in FIG. 8 (step 21). Then, it is determined whether or not, during a time period between the immediately preceding loop and the present loop, the second detection signal S12 of the second optical sensor 43 is held at the L level, and the third detection signal S13 of the third optical sensor 44 has changed from the H level to the L level (step 22). If the answer to this question is affirmative (YES), i.e. if the optical path of the second optical sensor 43 is kept blocked by the second shutter 41 and it is immediately after the optical path of the third optical sensor 44 has been blocked (t13 in FIG. 12), it is judged that it is timing immediately before the hammer shank 5*b* abuts against the stopper 18, i.e. timing immediately before the hammer 5 strikes the string S, so that the sounding start flag F_MSTR is set to "1" (step 24). Further, the pivotal speed, i.e. string striking speed of the hammer 5 is detected based on the difference (t13−t12) between a time point when the second detection signal S12 falls from the H level to the L level and a time point when the third detection signal S13 falls from the H level to the L level.

On the other hand, if the answer to the question of the step 22 is negative (NO), it is determined whether or not, during the time period between the immediately preceding loop and the present loop, the second and third detection signals S12 and S13 have both changed from the H level to the L level (step 23). If the answer to this question is affirmative (YES), i.e. if the optical paths of the respective second and third optical sensors 43 and 44 are both blocked, it is judged that the key 4 has been strongly depressed, so that the process proceeds to the step 24, wherein the sounding start flag F_MSTR is set to "1".

On the other hand, if the answer to the question of the step 23 is negative (NO), it is determined whether or not the first detection signal S11 has changed from the L level to the H level (step 25). If the answer to this question is affirmative (YES), i.e. if it is time immediately after the optical path of the first optical sensor 42 has been opened (t16 in FIG. 12), it is judged that the key 4 has been released, and a sounding stop flag F_MSTP is set to "1" so as to stop sounding (step 26). The following process is the same as that executed in FIG. 8 (steps 27 and 28).

As described above, according to the present embodiment, the light emitting diode 43*a* of the second optical sensor 43 and the phototransistor 44*b* of the third optical sensor 44 are arranged rightward of the pivotal path of the second shutter 41, while the phototransistor 43*b* of the second optical sensor 43 and the light emitting diode 44*a* of the third optical sensor 44 are arranged leftward of the pivotal path. This arrangement prevents the phototransistors 44*b* and 43*b* of the second and third sensors 43 and 44 from being reached by light from the light emitting diodes 43*a* and 44*a* of the other sensors, respectively. Therefore, similarly to the first embodiment, it is possible to cause the fall time t12 of the second detection signal S12 and the rise time t15 of the same to coincide with respective actual closing timing and opening timing in which the optical path is closed and opened by the second shutter 41, to thereby perform accurate detection. As a consequence, even when light beams emitted from the respective light emitting diodes 43*a* and 44*a* are divergent, it is possible to accurately detect string striking timing and string striking speed of the hammer 5 without being affected by the other optical sensors, for example. In short, the same advantageous effects as provided by the first embodiment can be provided.

In particular, according to the present embodiment, since the second and third optical sensors 43 and 44 detect the string striking speed of the hammer 5, it is possible to reduce the distance between the second and third optical sensors 43 and 44 to thereby more accurately detect an actual string striking speed of the hammer 5, which is important as touch information.

Further, the second shutter 41 is surface treated so as to reduce the amount of reflected light, so that it is possible to reliably eliminate the adverse influence of light emitted from the light emitting diode 44*a* of the third optical sensor 44 and reflected on the second shutter 41, on the second optical sensor 43. Similarly, even in a state where the optical paths of the second and third sensors 43 and 44 are both closed by the second shutter 41, when light from the light emitting diode 43*a* of the second optical sensor 43 is reflected on the second shutter 41, the amount of the reflected light is reduced, so that it is possible to reliably eliminate the adverse influence of the reflected light on the third optical sensor 44.

It should be noted that the present invention is by no means limited to the embodiment described above, but it can be practiced in various forms. For example, although two optical sensors are disposed in the vicinity of the key 4 in the first embodiment, and in the vicinity of the hammer 5 in the second embodiment, the number of the optical sensors may be increased. In this case, each adjacent two of the optical sensors are arranged such that the light emitting diode of one optical sensor and the phototransistor of the other are adjacent to each other. This makes it possible to obtain the same advantageous effects as described in the above embodiments, between the adjacent two optical sensors.

Although in the first embodiment, the first and second optical sensors 7 and 8 are arranged in the left-right direction, they may be arranged in the front-rear direction. Further, alternatively, they may be arranged along the pivotal path of the shutter 6. Furthermore, although in the first embodiment, the light emitting diode 7*a* of the first optical sensor 7 and the phototransistor 8*b* of the second optical sensor 8 are arranged rearward of the pivotal path of the shutter 6, and the phototransistor 7*b* and the light emitting diode 8*a* are arranged frontward of the pivotal path, it goes without saying that this positional relation can be reversed. This also applies to the second embodiment.

Further, although in the first embodiment, the shutter 6 is formed to have a shape of stairs so as to sequentially open and close the optical paths of the respective two optical sensors, this is not limitative, but the shutter may be formed with slits or windows. Further, although in the embodiments, each optical sensor is implemented by a photointerrupter comprised of a light emitting diode and a phototransistor, another suitable type of optical sensor may be employed. For example, the optical sensor may have a light emitting part formed e.g. by a laser diode and a light receiving part formed e.g. by a photodiode. Furthermore, although in the embodiments, a shutter is subjected to surface treatment, such as embossing work, so as to reduce reflected light, other suitable means may be employed in place of or in addition to the surface treatment. For example, coloration may be applied to a portion of the shutter including surfaces. For example, in a case where an infrared ray is emitted from the light emitting diode, the shutter may be colored in black. This enables the shutter to absorb the light to thereby reduce the amount of reflected light. It should be noted that this coloration may be performed after molding of the shutter, or alternatively, using e.g. a color resin during molding of the shutter.

Although in the second embodiment, only one sensor is disposed in the vicinity of the key 4, two sensors may be arranged, similarly to the first embodiment, such that the light emitting diodes and phototransistors of the two sensors may be disposed with the pivotal path of a shutter therebetween and in the respective positional relations reversed to each other, by applying the present invention thereto. In this case, for example, a key depression speed is detected according to the difference in rise timing between the two optical sensors, and the sounding stop timing is determined based on the detected key depression speed. In an acoustic piano, the action of a damper differs depending on whether the key 4 is released slowly or quickly. Therefore, by arranging the two optical sensors as above, it is possible to detect a key depression speed with high accuracy, and by determining the sounding stop timing based on the detected key depression speed, it is possible to faithfully realize the same sounding stop timing as in the acoustic piano where sounding is stopped by the damper.

Further, although in the second embodiment, the first to third detection signals S11 to S13 are delivered to the single sensor scan circuit 22, this is not limitative. For example, two sensor scan circuits may be separately provided such that the detection signal S11 from the first optical sensor 42 disposed in the vicinity of the key 4 can be delivered to one of the sensor scan circuits, and the second and third detection signals S12 and S13 from the respective second and third optical sensors 43 and 44 disposed in the vicinity of the hammer 5 can be delivered to the other sensor scan circuit. In this case, it is possible to easily connect the optical sensors to the respective associated sensor scan circuits, and increase the degree of freedom in layout of the optical sensors.

Further, although in the embodiments, the present invention is applied to the upright silent piano 2, by way of example, this is not limitative, but the present invention can be applied to a grand-type silent piano as well as to other types of keyboard instruments, such as an automatic performance piano and an electronic piano. Further, it is possible to apply the touch detecting device 1 according to the first embodiment not only to an automatic performance piano and an electronic piano each of which is provided with hammers, but also to other types of keyboard instruments including an electronic piano having no hammers. It is to be further understood that various changes and modifications may be made without departing from the spirit and scope thereof.

INDUSTRIAL APPLICABILITY

The touch detecting device of a keyboard instrument, according to the present invention, is used in a silent piano, an automatic performance piano, an electronic piano, or the like, and is useful in increasing the mounting density of a plurality of sensors, and accurately detecting touch information of each key without being adversely affected by light from the others sensors.

The invention claimed is:

1. A touch detecting device of a keyboard instrument, for detecting touch information containing key depression information of a pivotally movable key, comprising:

a shutter that pivotally moves in accordance with pivotal motion of the key;

a plurality of optical sensors that are provided close to a pivotal path of said shutter, and each have a light emitting part and a light receiving part for receiving light emitted from the light emitting part, said light emitting part and said light receiving part being disposed on respective opposite sides of the pivotal path; and touch information detecting means for detecting, as the key pivotally moves, the touch information based on presence or absence of light received by said light receiving parts of said optical sensors, in accordance with opening or closing of optical paths of light from said light emitting parts of said optical sensors, by said shutter, wherein adjacent two of said optical sensors are arranged such that said light emitting part of one of said two and said light receiving part of the other of said two are disposed adjacent to each other on a same side of the pivotal path of said shutter.

2. A touch detecting device as claimed in claim 1, wherein said shutter is configured to reduce an amount of light reflected thereby.

* * * * *